UNITED STATES PATENT OFFICE.

HOWARD B. BISHOP, OF MEDIA, PENNSYLVANIA.

PROCESS OF MAKING FLUORIDS.

1,382,165. Specification of Letters Patent. Patented June 21, 1921.

No Drawing. Application filed August 30, 1919. Serial No. 320,796.

*To all whom it may concern:*

Be it known that I, HOWARD B. BISHOP, a citizen of the United States, and a resident of Media, in the county of Delaware and State of Pennsylvania, have invented certain new and useful Improvements in Processes of Making Fluorids, of which the following is a specification.

My invention relates to improvements in making fluorids and more particularly to the simple fluorids of the alkali and alkaline earth metals, such as sodium, potassium, ammonium, magnesium, etc., from suitable silicofluorids.

The main object of the invention is to provide improvements whereby such simple fluorids may be easily and cheaply obtained from relatively inexpensive and plentiful raw materials. Further and more specific objects, features, and advantages will more clearly appear from the detail description given below.

According to my invention in its preferred form, I take a silicofluorid of one of the alkaline elements above mentioned, and which will decompose on boiling with caustic alkali and I boil the silicofluorid with water and an alkaline compound, preferably of the same alkaline element, and preferably in the form of an alkaline salt of said element to produce a simple fluorid of an alkaline element and a silicious compound. The resulting silicious compound is generally produced in the form of a gelatinous mass from which it is difficult to remove the simple fluorid. I, therefore, preferably treat the mixture of the silicious compound and simple fluorid with the hydrate of an alkaline element such as caustic alkali whereby a soluble compound of the silicious element is formed, so that the relatively insoluble simple fluorid may be easily removed therefrom as by filtration.

As a preferred example of my invention, I take sodium silicofluorid and boil it with water and sodium carbonate thereby producing simple sodium fluorid and gelatinous silica, carbon dioxid gas being given off. The reaction I believe, takes place substantially as follows:

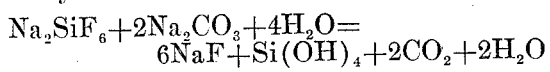

However, other alkaline compounds may be used, instead of the sodium carbonate, such as the carbonates of other alkali or alkaline earth metals or the hydrates thereof and any alkaline compound which is capable of reacting on the silicofluorid to produce the simple fluorid. The sodium fluorid is produced in the form of the sparingly soluble compound, but so mingled with the gelatinous mass that it is very difficult to remove the same therefrom, and I accordingly treat the mixture of sodium fluorid and gelatinous silicic acid by adding thereto caustic soda which unites with the gelatinous silicic acid to produce sodium silicate. The reaction I believe, takes place substantially in accordance with the following equation although the sodium silicate may be of varying composition:

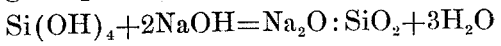

The sodium silicate being soluble, the sodium fluorid is easily filtered off after cooling.

The sodium silicofluorid which I prefer to use is a waste product or by-product from fertilizer manufacture and therefore serves admirably as a relatively cheap raw material or base for my process. The sodium fluorid finds important uses as an insecticide, for impregnating wood, softening water and for laundry purposes.

In a similar manner magnesium fluorid and other fluorids of the alkali or alkaline earth elements may be produced from the silicofluorids of these elements especially those which produce relatively insoluble fluorids. Potassium fluorid may be produced by treating potassium silicofluorid with potassium carbonate. In this case, however, the resulting potassium fluorid is soluble and may be at once separated from the precipitated silicious compound, or the mixture may be treated with caustic soda or caustic potash and used without separation. I preferably start with a silicofluorid which will decompose on boiling with caustic alkali or an alkaline carbonate. By the term alkaline element I include both those of the alkali group and alkaline earth group. It is not in every case necessary that the silicofluorid be treated with the carbonate or salt of an element which is the same as the alkaline element of the silicofluorid, but it is preferable that the element be the same. In carrying out the reactions the proportions of the materials used may be substantially the proportions of the above equations, except that an excess of water may be used.

It is not in every case necessary to boil, but heating the mixture is preferred in order to promote the reactions.

Instead of using a salt of an alkaline element for treating the silicofluorid, I may use the hydrates such as caustic soda or caustic potash with the result that the silica is rendered soluble in the first step. In such case, for example, the amount of caustic soda used would be an amount equivalent to the amount of sodium carbonate and caustic soda used in the two equations above given. This method, however, requires a much larger amount of caustic soda which is relatively expensive and accordingly I prefer to form the simple fluorid with the carbonate or other cheap salt of the alkaline element.

The sodium fluorid produced is slightly soluble in water so that the water in the resulting mixture will contain a slight amount, believed to be about 4% of sodium fluorid. This water may be used in boiling the next batch of silicofluorid. This is also true with regard to the wash water which may be used in washing out the precipitated sodium fluorid on the filter to free it from solution of sodium silicate. In this way all the sodium fluorid which may be dissolved in these waters is saved.

While I have described the invention in great detail, and given certain specific examples thereof, I do not desire to be limited to such details and examples since many changes and modifications may be made and the invention embodied in many different forms without departing from the spirit and scope thereof in its broader aspects.

What I claim as new and desire to secure by Letters Patent is:

1. In the process of making fluorids, the steps which consist in treating a silicofluorid, which will decompose on boiling with caustic alkali or an alkaline carbonate, with an alkaline compound capable of producing therefrom and producing therefrom a simple fluorid and a gelatinous silicious compound, and treating the mixture of the two with an alkaline hydrate to render the silicious element substantially soluble.

2. In the process of making fluorids, the steps which consist in treating a silicofluorid, which will decompose on boiling with caustic alkali or an alkaline carbonate, with an alkaline compound capable of producing therefrom and producing therefrom a simple fluorid and a gelatinous silicious compound, and treating the mixture of the two to render the silicious element substantially soluble, whereby the substantially insoluble fluorid may be easily separated therefrom.

3. In the process of making fluorids the step which consists in treating a mixture of a fluorid of an alkaline element and a gelatinous silicious compound with an alkaline element hydrate to render the silicious element substantially soluble.

4. In the process of making fluorids the steps which consist in treating a mixture of a fluorid of an alkaline element and a gelatinous silicious compound by chemically reacting on the silicious compound to render it substantially soluble and then separating the resulting substantially soluble silicious compound from the fluorid.

5. In the process of making fluorids, the steps which consist in treating the silicofluorid of an alkaline element with water and a salt of the same alkaline element to produce a simple fluorid of the element and a silicious compound and treating the mixture with the hydrate of the same element to render the silicious element substantially soluble.

6. In the process of making fluorids the steps which consist in treating a mixture of sodium fluorid and a gelatinous silicious compound by chemically reacting on the silicious compound to render it substantially soluble and then separating the resulting substantially soluble silicious compound from the fluorid.

7. In the process of making fluorids the steps which consist in treating a mixture of sodium fluorid and a gelatinous silicious compound with an alkaline hydrate to render the silicious element substantially soluble and then separating the resulting substantially soluble silicious compound from the relatively insoluble fluorid.

8. In the process of making fluorids, the steps which consist in taking an alkaline metal silicofluorid and boiling it with water and an alkaline carbonate to produce a simple fluorid of an alkaline element, treating the mixture with an alkaline element hydrate and separating out the relatively insoluble simple fluorid.

9. The process of making sodium fluorid which consists in taking sodium silicofluorid and treating it with sodium carbonate to produce sodium fluorid and a silicon compound, treating the mixture with sodium hydrate and separating out the sparingly soluble sodium fluorid.

Signed at New York, in the county of New York, and State of New York, this 29th day of August A. D. 1919.

HOWARD B. BISHOP.